United States Patent
Seok

(10) Patent No.: US 9,240,874 B2
(45) Date of Patent: *Jan. 19, 2016

(54) COEXISTENT CHANNEL ACCESS METHOD

(71) Applicant: LG Electronics Inc., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,602

(22) Filed: Aug. 7, 2014

(65) Prior Publication Data

US 2015/0003374 A1    Jan. 1, 2015

Related U.S. Application Data

(63) Continuation of application No. 13/202,028, filed as application No. PCT/KR2009/006940 on Nov. 24, 2009, now Pat. No. 8,830,973.

(60) Provisional application No. 61/153,299, filed on Feb. 18, 2009.

(51) Int. Cl.
*H04W 4/00* (2009.01)
*H04L 5/00* (2006.01)
*H04W 52/24* (2009.01)
(Continued)

(52) U.S. Cl.
CPC ............ *H04L 5/0053* (2013.01); *H04L 5/0023* (2013.01); *H04W 52/248* (2013.01); *H04W 52/281* (2013.01); *H04W 52/42* (2013.01);
(Continued)

(58) Field of Classification Search
None
See application file for complete search history.

(56) References Cited

U.S. PATENT DOCUMENTS

2005/0003794 A1   1/2005   Liu
2005/0181728 A1   8/2005   Hansen et al.
(Continued)

FOREIGN PATENT DOCUMENTS

CN      101069386 A     11/2007
EP      1 622 290 A1     2/2006
(Continued)

OTHER PUBLICATIONS

"IEEE P802.11N?/D2.02, Draft Standard for Information Technology . . ." IEEE Draft; 11-07-0595-00-000N-TGN-REDLINE-D202-CMP-D2-00-Insertions, IEEE-SA, XP017630614, Piscataway, New Jersey, USA, May 3, 2007, 488 pages.
(Continued)

*Primary Examiner* — Andrew Lai
*Assistant Examiner* — Jamaal Henson
(74) *Attorney, Agent, or Firm* — Birch, Stewart, Kolasch & Birch, LLP

(57) ABSTRACT

A method for transmitting a multiple input multiple output (MIMO) packet in a wireless local area network is described. The method includes generating a physical layer protocol data unit (PPDU) including a short training field (STF), a long training field (LTF), a very high throughput (VHT)-signal field, a VHT-STF, a VHT-LTF and a plurality of data streams. The STF is used for at least one receiver to estimate an automatic gain control and a coarse frequency offset. The LTF is used for the at least one receiver to estimate a fine frequency offset. The VHT-STF is used for improving automatic gain control estimation in a MIMO transmission. The VHT-LTF is used for estimating a MIMO channel based on the plurality of data streams. The PPDU is transmitted to the at least one receiver.

12 Claims, 6 Drawing Sheets

(51) Int. Cl.
*H04W 52/28* (2009.01)
*H04W 52/42* (2009.01)
*H04W 52/52* (2009.01)
*H04W 72/04* (2009.01)
*H04W 84/12* (2009.01)

(52) U.S. Cl.
CPC .......... *H04W 52/52* (2013.01); *H04W 72/0473* (2013.01); *H04W 84/12* (2013.01)

(56) References Cited

U.S. PATENT DOCUMENTS

| | | |
|---|---|---|
| 2006/0126545 A1 | 6/2006 | Nanda |
| 2007/0086420 A1 | 4/2007 | Schotten et al. |
| 2010/0074198 A1* | 3/2010 | Morioka ............... H04L 12/413 370/329 |
| 2010/0091716 A1 | 4/2010 | Bonta et al. |
| 2010/0091717 A1* | 4/2010 | Bonta .................... H04W 74/08 370/329 |
| 2010/0246541 A9* | 9/2010 | Kim ..................... H04L 1/0003 370/338 |
| 2011/0170485 A1 | 7/2011 | Nakao |

FOREIGN PATENT DOCUMENTS

| | | |
|---|---|---|
| EP | 1 357 704 B1 | 7/2008 |
| JP | 2008-193223 A | 8/2008 |
| JP | 2008-252867 A | 10/2008 |
| JP | 2009-27752 A | 2/2009 |
| WO | WO 2010/021900 A2 | 2/2010 |

OTHER PUBLICATIONS

"P802.11.REVma_D9.0 Redline," IEEE Draft; P802.11.REVMA_D9.0_REDLINE, IEEE-SA, XP017758583, Piscataway, New Jersey, USA, Jan. 5, 2007, 1231 pages.

* cited by examiner

COEXISTENT CHANNEL ACCESS METHOD

CROSS-REFERENCE TO RELATED APPLICATIONS

This application is a Continuation of co-pending U.S. patent application Ser. No. 13/202,028 filed on Aug. 31, 2011, which is the National Phase of PCT/KR2009/006940 filed on Nov. 24, 2009, which claims priority under 35 USC 119(e) to U.S. Provisional Application No. 61/153,299 filed on Feb. 18, 2009. The contents of all of these applications are hereby incorporated by reference as fully set forth herein in their entirety.

BACKGROUND OF THE INVENTION

1. Field of the Invention

The present invention relates to a wireless communication system and, more particularly, to channel accessing and data stream transmission technique in a wireless local area network (WLAN) system in which a legacy station exists.

2. Discussion of the Related Art

Recently, diverse wireless communication technologies are under development in line with the advancement of information communication technology. Among them, a wireless local area network (WLAN) is a technique allowing users to wirelessly access the Internet by using mobile terminals such as personal digital assistants (PDAs), lap top computers, portable multimedia players (PMPs), and the like, at homes, offices or in a particular service providing area based on a radio frequency technology.

Since IEEE (Institute of Electrical and Electronics Engineers) 802, a standardization organization of a WLAN technique, was established in February 1980, a great deal of standardization works have been conducted.

The early WLAN technique supported the rate of 1-2 Mbps through frequency hopping, spread spectrum, infrared communications, and the like, by using a 2.4 GHz frequency based on IEEE 802.11, and recently, a maximum rate of 54 Mbps can be supported by applying orthogonal frequency division multiplex (OFDM) technology to the WLAN. Further, IEEE 802.11 are putting standards of various techniques, such as improvement of quality of service (QoS), allowing compatibility of access point (AP) protocols, achievement of security enhancement, measurement radio resource measurement, wireless access vehicular environment, ensuring fast roaming, establishing a mesh network, interworking with an external network, wireless network management, and the like, into practical use or are still developing them.

Among the IEEE 802.11, IEEE 802.11b supports a maximum of 11 Mbs communication speed while using the frequency band of 2.4 GHz. IEEE 802.11a, which has been commercialized following the IEEE 802.11b, uses the frequency band of 5 GHz, not 2.4 GHz, to reduce the influence of interference compared with the considerably congested frequency band of 2.4 GHz and has a communication speed increased up to a maximum 54 Mbps by using the OFDM technique. However, IEEE 802.11a has shortcomings in that its communication distance is shorter than that of IEEE 802.11b. Meanwhile, IEEE 802.11g uses the frequency band of 2.4 GHz, like IEEE 802.11b, to implement a communication speed of a maximum 54 Mbps and satisfies backward compatibility, and as such, IEEE 802.11g receives much attention. Also, IEEE 802.11b is superior to IEEE 802.11a, in the aspect of the communication distance.

IEEE 802.11n has been lately stipulated as a technique standard to overcome the limitation in the communication speed which has been admitted as a weak spot of the WLAN. IEEE 802.11n aims to increase the speed and reliability of a network and extend an operation distance of a wireless network.

In more detail, IEEE 802.11n supports a high throughput (HT) of more than a maximum 540 Mbps as a data processing speed, and is based on a multiple input and multiple output (MIMO) technique using multiple antennas at both ends of a transmission part and a reception part to minimize a transmission error and optimize a data rate.

Also, IEEE 802.11n standard may use orthogonal frequency division multiplex (OFDM) to increase the speed as well as using a coding scheme that transmits several duplicates to enhance data reliability.

As the WLAN is widely spreading and applications using WLAN are diversified, recently, the necessity for a new WLAN system emerges to support a higher throughput than the data processing speed supported by IEEE 802.11n.

A very high throughput (VHT) WLAN system is one of the newly proposed IEEE 802.11 WLAN systems in order to support a data processing speed of 10 Gbps or faster in a MAC service access point (SAP). The term of VHT WLAN system is arbitrary, and currently, a feasibility test is performed on a 4.times.4 MIMO (or 5.times.4 MIMO) and a system using a channel bandwidth of 80 MHz or higher to provide throughput of 1 Gbps or faster.

Aiming at satisfying an aggregated throughput of 1 Gbps, the VHT WLAN system also has the purpose of achieving a minimum 500 Mbps for one-to-one communications between terminals (e.g., user equipments (UEs)). If an offered load of VHT stations is 500 Mbps, it would be effective for the several VHT stations to simultaneously use channels to satisfy the aggregated throughput of 1 Gbps of a VHT basic service set (BSS).

The case of the VHT WLAN system has been described, but in most cases where UEs in conformity with the standards of the WLAN system and legacy UEs coexist, the legacy UEs support a narrower channel bandwidth and a smaller number of antennas than those of the UEs supporting the current standard of the WLAN system. Thus, while the legacy UEs use channels, some channel bandwidths and antennas are not in use, resulting in a waste of radio resources.

SUMMARY OF THE INVENTION

Therefore, an object of the present invention is to seek an effective use of radio resources in transmitting a data stream in a wireless local area network (WLAN) system in which legacy stations exist.

Another object of the present invention is to reduce a waste of radio resources or antennas in the case where an access point (AP) and a station supporting multiple antennas and a station that does not support multiple antennas coexist.

According to an aspect of present invention, a method for transmitting a coexistent data stream, the method including: transmitting coexistent data stream transmission information including transmission power information of a first data stream targeted for a first station and transmission power information of a second data stream targeted for a second station in an environment in which the first station, a legacy station, coexists with a second station, a station supporting a wireless local area network (WLAN) system evolved further than the first station; and transmitting, by an access point (AP), the first and second data streams to the second station and the first station, wherein the AP transmits the first data stream with a higher transmission power level than that of the second data stream according to the coexistent data stream transmission information.

According to another aspect of present invention, a method for transmitting a coexistent data stream, the method including: when a first data stream is targeted for a second station and a third data stream is targeted for a first station in an environment in which the first station, a legacy station, coexists with a second station, a station supporting a wireless local area network (WLAN) system evolved further than the first station, generating, by an access point (AP), a second data stream, an inverse stream of the first data stream; and transmitting the first data stream, the second data stream, and the third data stream to the first station and the second station, wherein an integrated stream of the first to third data streams is the same as the third data stream.

According to still another aspect of present invention, a method for transmitting a coexistent data stream, the method including: transmitting, by an access point (AP), coexistent data stream transmission information to a first station, a legacy station, and a second station supporting a wireless local area network (WLAN) system evolved further than the first station; transmitting a first data stream to the first station via a first subchannel among an entire channel bandwidth according to the coexistent data stream transmission information; and transmitting a second data stream to the second station via a subchannel, excluding the first subchannel, among the entire channel bandwidth according to the coexistent data stream transmission information.

According to still another aspect of present invention, a wireless communication device including: a processor configured to generate coexistent data stream transmission information including transmission power information of first data stream and the second data stream to be transmitted to first and second stations, and adjust the transmission power of first data stream and the second data stream according to the transmission power information, in an environment in which the first station, a legacy station coexists with a second station, a station supporting a wireless local area network (WLAN) system evolved further than the first station; and a radio frequency (RF) unit configured to transmit the coexistent data stream transmission information and transmit the first data stream and the second data stream with the adjusted transmission power.

According to still another aspect of present invention, a wireless communication device including: a processor configured to generate a second data stream, an inverse stream of a first data stream, when the first data stream is targeted for a second station and a third data stream is targeted for a first station in an environment in which the first station, a legacy station coexists with a second station, a station supporting a wireless local area network (WLAN) system evolved further than the first station; and a radio frequency (RF) unit configured to transmit the first data stream, the second data stream, and the third data stream to the first and second stations, wherein an integrated stream of the first to third data streams is the same as the third data stream.

In an environment in which legacy stations coexist, a data stream can be simultaneously transmitted to every station. In addition, a waste of radio resources that may be generated as data is transmitted to the legacy stations in the coexistence environment. To this end, a method of transmitting a control signal such that it can be recognized by stations including the legacy stations in the coexistence environment and transmitting the data stream by effectively using antennas and radio resources is provided.

DETAILED DESCRIPTION OF THE INVENTION

Figure 1:
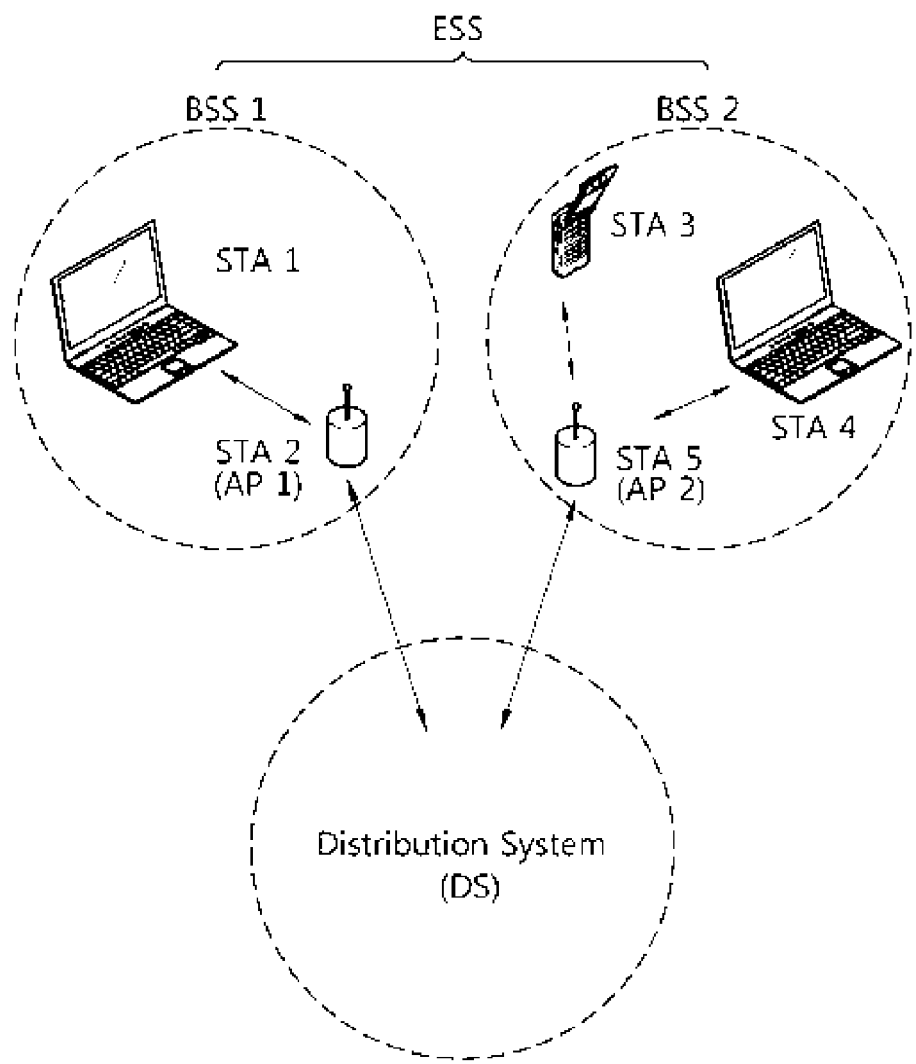
FIG. 1 illustrates the configuration of a wireless local area network (WLAN) system to which an exemplary embodiment of the present invention can be applicable.

FIG. 1 illustrates the configuration of a wireless local area network (WLAN) system to which an exemplary embodiment of the present invention can be applicable.

The WLAN system illustrated in FIG. 1 includes one or more basic service sets (BSSs). A BSS refers to a set of stations (STAs) that can communicate with each other in synchronization, not a concept indicating a particular area. Like the WLAN system to which the exemplary embodiments of the present invention are applicable, a BSS that supports the data processing at a high speed of 1 GHz or faster at a MAC SAP is called a VHT BSS.

The VHT BSS can be classified into an infrastructure BSS and an independent BSS (IBSS). FIG. 1 shows infrastructure BSSs.

The infrastructure BSSs (BSS1 and BSS2) include one or more of non-AP STA1, non-AP STA3, and non-AP STA4, access points (APs) (AP STA1 and AP STA2), stations providing a distribution service, and a distribution system (DS) connecting the plurality of APs (AP STA1 and AP STA2). In the infrastructure BSS, the AP stations manage the non-AP stations of the BSSs.

Meanwhile, the IBSS is a BSS operating in an ad-hoc mode. Because the IBSS does not include an AP VHT STA, it does not have a centralized management entity. Namely, in the IBSS, non-AP stations are managed in a distributed manner. In the IBSS, every station may be a mobile station, and the IBSS establishes a self-contained network, not allowing an access to a distribution system (DS).

A station (STA) is an arbitrary functional medium including a medium access control (MAC) and wireless-medium physical layer (PHY) interface conforming to the institute of electrical and electronics engineers (IEEE) 802.11 standard. In a broad sense, the STAs include both AP and non-AP STAs. In a multi-channel environment (to be described), a station supporting data processing at a very high speed of 1 GHz or higher is called a VHT STA. The VHT WLAN system to which the exemplary embodiments of the present invention is applicable, stations included in the BSSs include a VHT STA, a legacy station (e.g., a non-VHT station such as HT STA and the like in conformity with IEEE 802.11n. That is, the stations coexist in the environment.

Among STAs, mobile terminals manipulated by a user are the non-AP STAs (STA1, STA3, and STA4). Simply referring to a station may indicate a non-AP STA. In particular, a station without an indication as legacy station may refer to a station supporting the standard of the current wireless communication system. Thus, in the VHT WLAN system, a station generally indicates a VHT station and a non-VHT station is a legacy station.

The non-AP STA may be referred to by other names such as terminal, wireless transmit/receive unit (WTRU), user equipment (UE), mobile station (MS), mobile terminal, mobile subscriber unit, or the like. A non-AP STA supporting data processing at a high speed of 1 GHz or faster in the multi-channel environment (to be described) may be also called a non-AP VHT STA or simply a VHT STA.

The APs (AP1 and AP2) are functional entities for providing an access to the DS by way of a wireless medium for an STA associated thereto. In the infrastructure BSS including the APs, in principle, communications between non-AP STAs are made by way of the APs, but when a direct link has been established, the non-AP STAs can directly communicate with each other.

The AP may be also called by other names such as centralized controller, base station (BS), node-B, base transceiver system (BTS), site controller, and the like, than the AP. In the multi-channel environment (to be described), an AP supporting high speed data processing at 1 GHz or faster is called a VHT AP.

A plurality of infrastructure BSSs may be connected via the DS. The plurality of BSSs connected via the DS is called an extended service set (ESS). STAs included in the ESS may communicate with each other, and the non-AP STA may move from one BSS to another BSS within the same ESS while seamlessly performing communication.

The DS is a mechanism allowing one AP to communicate with another AP. Through the DS, an AP may transmit a frame for STAs associated to the BSS managed by the AP, transfer a frame when one STA moves to another BSS, or transmit or receive frames to and from an external network such as a wireline network. The DS is not necessarily a network. Namely, the DS is not limited to any form so long as it can provide a certain distribution service defined in the IEEE 802.11 standard. For example, the DS may be a wireless network such as a mesh network or a physical structure connecting the APs.

In the case of assuming the VHT WLAN system, here, the AP supports the VHT system unless there is a limitation that the AP is a legacy AP. In the VHT BSS, a legacy station supporting and a station supporting the VHT system coexist.

In the VHT WLAN system, the non-VHT station, a legacy station, is, for example, an STA supporting a system following IEEE 802.11a/b/g standards. In case of the IEEE 802.11a/b/g STA, it supports only a single antenna, so it cannot support MIMO. Thus, in the VHT system, the AP have no choice but to transmit only a single stream to the IEEE 802.11a/b/g STA.

In addition, the IEEE 802.11a/b/g STA supports a channel bandwidth of 20 MHz, failing to support a wider channel bandwidth (e.g., channel bandwidth of 40 MHz or 80 MHz). Thus, although the VHT AP is able to support the channel bandwidth of 80 MHz, it is allowed to use only the channel bandwidth of 20 MHz when transmitting data to the IEEE 802.11a/b/g.

In the VHT WLAN system, if the AP supports five antennas and a legacy station (e.g., a station following the an IEEE 802.11a/b/g/n standard) supports one antenna, when the AP transmits data to the legacy station, only one of the five antennas is used while the other remaining four antennas are not in use.

If the AP supports a channel bandwidth of 80 MHz and the legacy station supports only a channel bandwidth of 20 MHz, when the AP transmits data to the legacy station, merely 20 MHz in the channel bandwidth of 80 MHz is used while the other remaining 60 MHz is not used.

The present invention proposes a scheme of allocating the other remaining resources, which are not in use while the AP transmits data to the legacy station, to other stations. In the following description, a VHT system having the 4.times.4 MIMO (or 5.times.4 MIMO) and 80 MHz channel bandwidth will be taken as an example.

Namely, the present invention relates to a channel accessing method or the use of channels in data transmission in an environment in which the station according to the current wireless communication system and the legacy station coexist, which may be simply called a coexistent channel access mechanism. Here, the AP supporting the VHT WLAN system may have four or more antennas and a channel bandwidth of 80 MHz or wider.

Figure 2:
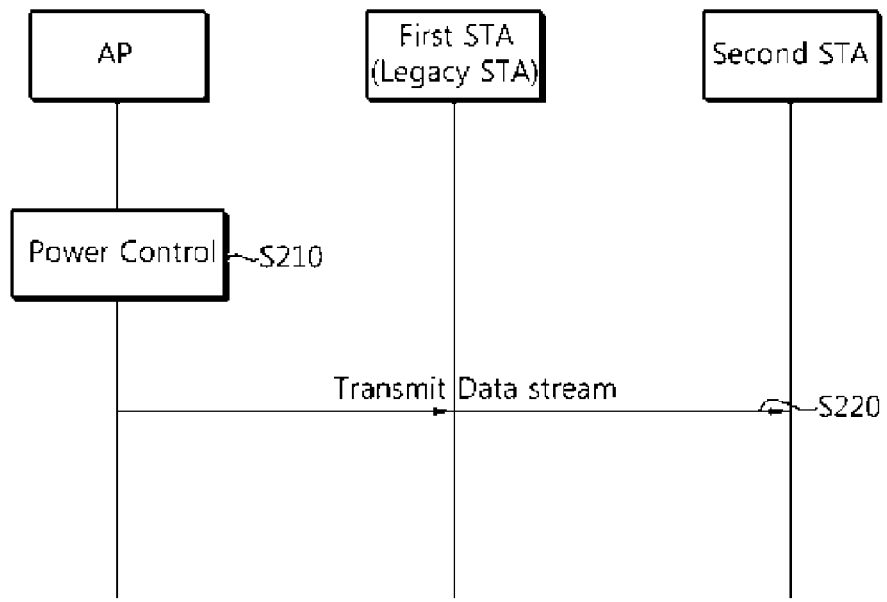
FIG. 2 illustrates a method for transmitting a coexistent data stream according to one exemplary embodiment of the present invention.

FIG. 2 illustrates a method for transmitting a coexistent data stream according to one exemplary embodiment of the present invention.

As stated above, the present invention proposes a method and system for transmitting common control information in a communication system in which a legacy station and a station according to the communication system which has evolved from the legacy communication system coexist.

In the following description, the legacy station will be referred to as a first station, and the station according to the evolved communication system will be referred to as a second station. The first station may be a station following a standard before 802.11n, while the second station may be a station following a standard after 802.11n. The second communication system may be a VHT WLAN system.

As afore-mentioned, in the WLAN environment according to an exemplary embodiment of the present invention, the first and second stations coexist in the WLAN system. For example, the VHT station and the non-VHT station coexist in the VHT WLAN system. The first station supports a single antenna and the second station supports multiple antennas. Also, it is assumed that the second station supports a wider channel bandwidth than that of the first station.

Because the first station does not support multiple antennas, while the AP is transmitting data to the legacy station, the first station cannot use antennas or a channel bandwidth which could be used if the AP transmits a data stream to the second station. Thus, resources are wasted.

In the antenna coexistence scheme, the AP allocates antennas separately to the first and second stations, and simultaneously transmits data streams separately to the first and second stations. In this case, transmission power of each data stream is adjusted to be different (S210).

Before transmitting the data streams, the AP may transmit coexistent data stream transmission information to the first and second stations. The coexistent data stream transmission information may include transmission power information. The first station receives only a data stream with the most powerful signal strength via the single antenna, while the second station can receive every data stream by each different antenna. Thus, the second station needs prior information regarding transmission power with which each data stream is to be transmitted. Namely, in the present exemplary embodiment, the coexistent data stream transmission information may be information particularly required by the second station.

In the present exemplary embodiment, the coexistent data stream transmission information is information about transmission power of each data stream. However, in a different embodiment, the coexistent data stream transmission information may include information about through which subchannel each stream is to be transmitted, information about a channel bandwidth used for transmitting each stream, information about whether or not there is a redundant stream among the streams, and the like.

The AP increases transmission power of a data stream to be transmitted to the first station and decreases transmission power of a data stream to be transmitted to the second station, and transmits the data streams (S220). As a result, at the position of a reception side, the signal strength of the data stream targeted for the first station is recognized to be the most powerful, while that of the data stream targeted for the second station is recognized to be relatively weak.

Thus, the data stream transmitted to be targeted for the second station acts as interference to the first station. Namely, the first station receives only the single data stream whose signal strength is recognized to be most powerful as its transmission power strong among the plurality of data streams which have been transmitted with transmission power set to be different from the AP. This is like the case of a capture effect.

In this case, a modulation coding scheme (MCS) value of the data stream transmitted to be targeted for the first station must be determined in consideration of the interference of the data stream transmitted to the second station.

The MCS value of the data stream targeted for the first station must be set to satisfy a minimum receiver sensitivity in determining transmission power of the data stream destined for the second station. When transmission power of each stream is differentiated, the AP needs to inform the second station about transmission power of each data stream in advance. To this end, a physical layer convergence procedure (PLCP) frame format may include a transmission power indicator with respect to each data stream. Namely, in the coexistent data stream transmission information, the transmission power information or the transmission power indicator may be included in the PLCP frame format and transmitted.

Figure 3:
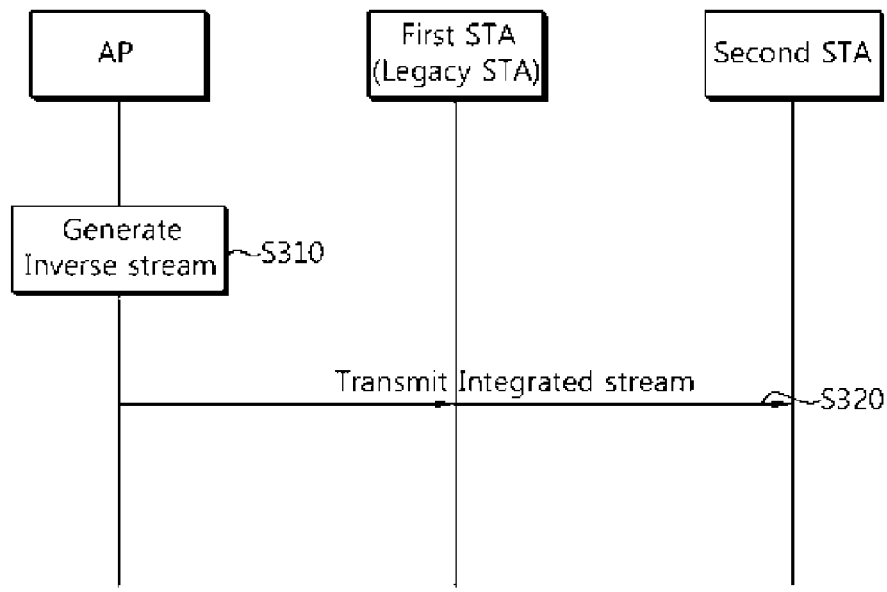
FIG. 3 illustrates a method for transmitting a coexistent data stream according to another exemplary embodiment of the present invention.
Figure 4:
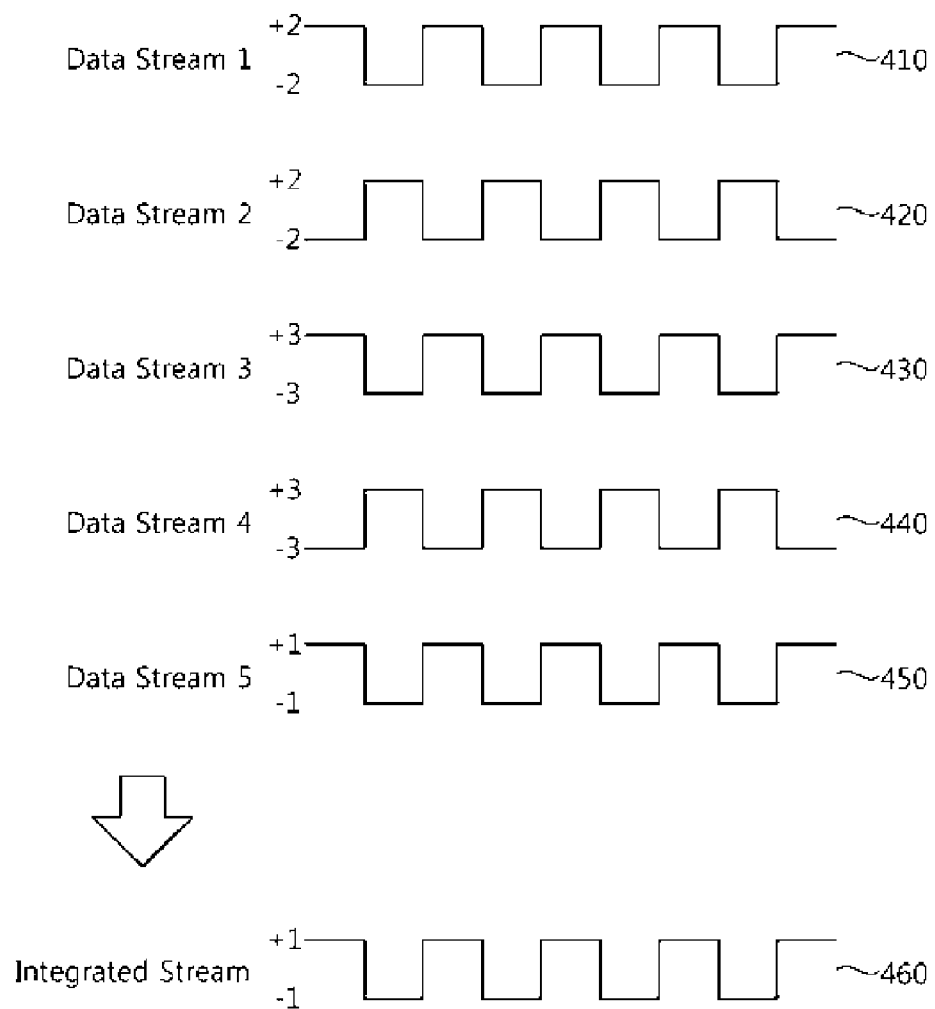
FIG. 4 illustrates data streams transmitted in an exemplary embodiment of the present invention described with reference to FIG. 3.

FIG. 3 illustrates a method for transmitting a coexistent data stream according to another exemplary embodiment of the present invention, and FIG. 4 illustrates data streams transmitted in an exemplary embodiment of the present invention described with reference to FIG. 3.

In an exemplary embodiment described with reference to FIG. 3, a first station refers to a legacy station (e.g., a non-VHT STA in the VHT system), and a second station refers to a station (e.g., a VHT station in a VHT WLAN system0 supporting the standard of the evolved WLAN system.

A method of transmitting inverse streams with respect to some of data streams together in transmitting the data streams to the first and second stations will be described with reference to FIG. 3. In the present exemplary embodiment described with reference to FIG. 3, transmission power of the streams transmitted by the AP does not need to be set to be different. Here, the some data streams transmitted together with the inverse streams are data streams transmitted to be targeted for the second station.

The AP transmits the data streams and inverse streams of the data streams redundantly to the second station, so that the two data streams are canceled out in their sum. As a result, the sum of the data streams transmitted to the first station and the data streams and the inverse streams transmitted to the second station is equal to the data streams transmitted to the first station. At the position of the first station, it receives the integrated stream 460 of the three types of data streams, resulting in that the first station can normally receive the data stream targeted for the first station.

To this end, the transmitter side may need to perform a process of correcting the phases and amplitudes of the data streams such that the phases and the amplitudes of the respective data streams are shown to be the same at the position of the receiver side, namely, at the position of the first station. By correcting the phases and amplitudes, the data streams in the mutually inverse stream relationship may be canceled out. Namely, the first and second data streams can be canceled out, and the third and fourth streams may be canceled out.

The process of correcting the phases and/or amplitudes is performed through a channel estimation between the first and second stations, the receivers, and the AP, the transmitter. In the exemplary embodiment in which the PLCP frame uses the inverse streams, the channel estimation is advantageous in that its performance is determined regardless of an SINR of the first and second stations.

With reference to FIG. 4, in the VHT system according to an exemplary embodiment of the present invention, the AP supports five antennas and may transmit five data streams via the five antennas. The five data streams may indicate a first data stream 410, a second data stream 420, a third data stream 430, a fourth data stream 440, and a fifth data stream 450.

In this case, the first data stream of the AP corresponds to data targeted for the second station. The second data stream corresponds to an inverse stream with respect to the first data stream. The third data stream corresponds to another data targeted for the second station. The fourth data stream is an inverse frame with respect to the third data stream. Here, the third data stream may be targeted for a terminal that can support the same wireless communication system as that of the second station. Finally, the fifth data stream corresponds to data targeted for the first station, the legacy station.

First, the AP generates the first data stream 410, the second data stream 420 which is the inverse stream of the third data stream 430, and the fourth data stream 440 (S310). And then, the AP transmits the integrated stream 460 obtained by adding the original data streams and their inverse streams desired to be transmitted to the stations, to the first and second stations (S320). In this case, the AP may transmit the integrated stream 460 in a broadcasting or unicasting manner.

The integrated stream 460 represents a stream obtained by integrating all of the first data stream 410, the second data stream 420, the third data stream 430, the fourth data stream 440, and the fifth data stream 450, and the first station receives the integrated stream 460.

Here, as shown in FIG. 4, the first data stream 410 and the second data stream 420 are in the relationship that they are mutually inverse streams. Thus, when the first data stream 410 and the second data stream 420 are added to be transmitted, they may be seen to be canceled out. Likewise, the third data stream 430 and the fourth data stream 440 are also in the relationship that they are mutually inverse streams, so when an integrated stream is generated, the third and fourth data streams 430 and 440 are canceled out. Consequently, the phase of the integrated stream 460 of the first to fifth data streams 410 to 450 is the same as that of the fifth data stream 450.

In order to allow the first and second data streams and the third and fourth data streams to be completely canceled out, the AP may correct the phases and amplitudes of the second and fourth data streams.

Accordingly, the first station can receive the fifth data stream 450 by receiving the integrated stream 460. Meanwhile, the second station may separately recover the first to fifth data streams 410 to 450 from the integrated stream.

That is, although the second station receives the integrated stream, it can separately restore the first data stream 410 or the third data stream 430. However, the first station may not be able to separately restore the data stream due to the limitation in the number of supported antennas or the channel bandwidth.

Here, the second and fourth data streams 420 and 440, the inverse streams, correspond to redundant data, and the VHT stations can purely receive the first and third data streams. In addition, the second and fourth data streams 420 and 440, the inverse streams, may be used to recover a signal when the first and third data streams 410 and 430 have an error.

Here, the coexistent data stream transmission information may be provided to the station before transmission of the data streams. The coexistent data stream transmission information according to the present exemplary embodiment described with reference to FIGS. 3 and 4 includes whether or not each data stream is an inverse stream or to which data stream, an inverse stream corresponds, and the like.

Figure 5:
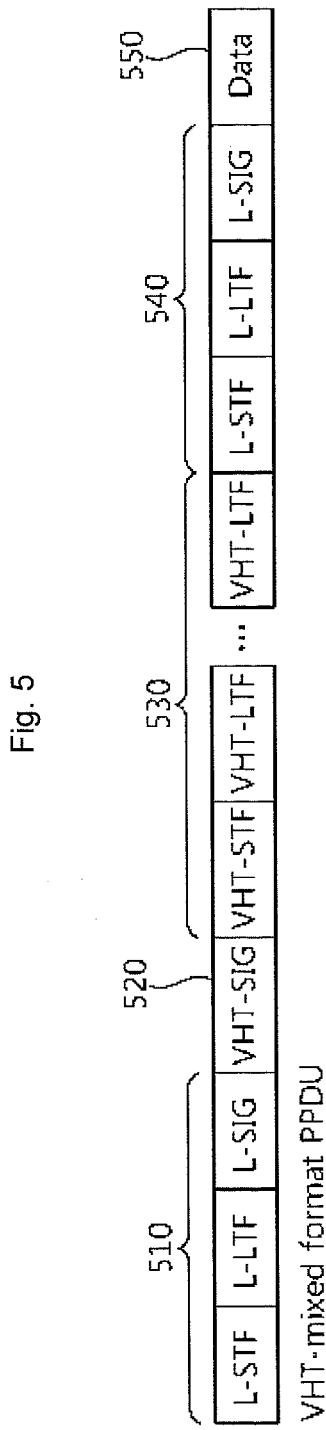
FIGS. 5 and 6 illustrate PLCP frame formats according to an exemplary embodiment of the present invention.
Figure 6:
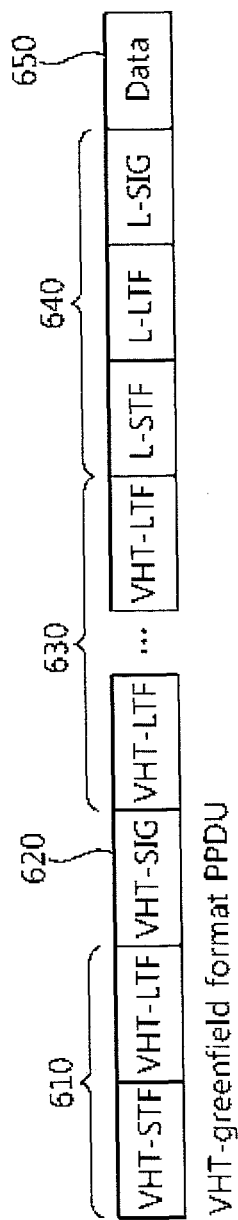

FIGS. 5 and 6 illustrate PLCP frame formats according to an exemplary embodiment of the present invention. The frame formats illustrated in FIGS. 5 and 6 shows VHT PLCP frame formats that can provide information regarding the use of channels to stations in a situation in which a station and a legacy station coexist. Also, in the present exemplary embodiment, the legacy station will be referred to as a first station, and a station following the evolved communication system will be referred to as a second station.

The PLCP frame formats in conformity with the IEEE 802.11n standard will now be described. The PLCP frame formats include three modes of frame formats: non-HT format, HT mixed format, and Greenfield format. In the present exemplary embodiment, the PLCP frame formats of the VHT mixed format and the Greenfield format, among the three modes of non-VHT format, the VHT mixed format, and the Greenfield format, will be described by taking a VHT, not HT, WLAN system as an example.

The non-VHT format is a structure for compatibility between the legacy station and the VHT station. The VHT mixed format illustrated in FIG. 5 is the same as the non-VHT from L-STF to L-SIG, and uses the following VHT-SIG signal. Thus, it is noted that the FHT station has the mixed format. The Greenfield format illustrated in FIG. 6 is a non-compatible format which can be received only by the VHT station.

The PCLP frame format includes a PLCP preamble, a PCLP header, and data. The PLCP preamble is a signal for synchronization of an OFDM physical layer and channel estimation. The PLCP preamble includes a short training field (STF) and a long training field (LTF).

The STF performs functions of signal detection, automatic gain control (AGC), diversity selection, fine time synchronization, and the like, and the LTF performs functions of channel estimation, a fractional multiplication frequency error estimation, and the like.

Of them, the L-STF, an STF for the legacy station, is used for AGC, timing synchronization, and rough frequency synchronization. An L-LTF, an LTF for the legacy station, is used for fine frequency offset estimation and channel estimation of the legacy station.

The L-SIG includes information about a data transmission rate and a data length. By putting a value corresponding to the length of an actual frame into the length field, even the L-SIG can be decoded when 802.11a/g terminals receive the mixed format frame.

The VHT-STF preamble is used for improvement of performance of AGC or fine AGC in the mixed format. In the Greenfield format, it is used for AGC, timing synchronization, and rough frequency synchronization.

A VHT-LTF may be used for MIMO channel estimation. Because channels as many as time and space streams should be estimated, the number of HT-LTFs increases depending on the number of time and space streams.

A VHT-SIG transfers information about a VHT packet, when the VHT packet is transmitted. The VHT-SIG will be described in detail later.

FIG. 5 illustrates the PLCT frame format in case where the AP simultaneously transmits data streams to the second and first stations in the environment in which the first and second stations coexist, and FIG. 6 illustrates the PLCP frame format in case where the AP transmits data streams to the second and first stations but not simultaneously. The PLCP frame format of FIG. 5 is indicated as VHT-mixed format PPDU, while the PLCP frame format of FIG. 6 is indicated as a VHT-greenfield format PPDU. This is because the VHT WLAN system is illustrated as the WLAN system, and the types and standards of the WLAN systems do not limit the scope of the present invention.

The PLCP frame format illustrated in FIG. 5 and the PLCP frame format illustrated in FIG. 6 are different according to whether or not the L-STF (Legacy-Short Training Field), L-LTF (Legacy-Long Training Field), L-SIG (Legacy-Signal) 510 for the first station, the legacy station, are included at a front portion of the header, and the other portions are the same. The L-STF, L-LTF, and L-SIG 510 are fields for channel estimation of legacy stations. Channel estimation is made between the first station and the AP via the L-STF, L-LTF, and L-SIG 510. These fields indicate that a channel is busy, and are required to reset a network allocation vector (NAV). In addition, the VHT-STF and the VHT-LTF 530 and 610 are fields for channel estimation between the VHT station and the AP.

When the AP transmits a data stream toward the legacy station (e.g., the above-mentioned non-VHT station), it uses only a partial channel among the entire channel bandwidth. In an exemplary embodiment of the present invention, it is intended that the AP transmits data streams targeted for the second station through a channel bandwidth which is not used when the AP transmits a data stream toward the first station, the legacy station.

This method may be called a frequency division multiplex access scheme, and when this method is employed, the VHT PLCP frame format may include a channel bandwidth offset value with respect to each data stream.

In order to perform a coexistent channel access mechanism with the legacy station, a PLCP frame format that can be recognized by both the first station, the legacy station, and the second station should be used. In addition, for a MIMO operation and an SDMA operation of second stations, a currently supported WLAN system-specific PLCP frame format needs to be used.

To this end, the PLCP frame format proposed in the present invention may further include the values of L-STF (Legacy Short Training Field), L-LTF (Legacy Long Training Field), and L-SIG (Legacy Signal) (540) for the legacy station at the end portion of the PLCP header, namely, immediately before data 550 transmission.

In addition, in order to support the MIMO and SDMA operations of the VHT STA, a channel estimation process through the VHT specific fields should be performed, and in this case, the VHT specific fields are added in front of the L-STF, L-LTF, and L-SIG (540) in the header of the PLCP frame. Namely, the values VHT-STF, VHT-LTF (520, 620), and VHT-SIG (520, 620) are transmitted before transmission of the L-STF, L-LTF, and L-SIG (540, 640).

The L-STF, L-LTF, and L-SIG (540, 640) finally transmitted in the PLCP header are used only in the coexistent channel access mechanism according to the exemplary embodiment of the present invention. In case of not simultaneously transmitting to the VHT station and the legacy station, the values L-STF, L-LTF, L-SIG (540, 640) do not need to be added to the PLCP header immediately before transmission of the data (550 and 650).

In the coexistent channel accessing process, the AP may include information about a transmission type of data streams, the use of channels, or the like, namely, the aforementioned coexistent data stream transmission information, in the VHT-SIG (520, 620) of the PLCP header and transmit the same to the stations. For example, the VHT-SIG (520, 620) may include a value indicating the presence or absence of the L-STF, L-LTF, and L-SIG (540, 640). Namely, whether or not a plurality of transmitted data streams are to be simultaneously transmitted to the VHT station and the legacy station may be indicated by indicating whether or not the L-STF, L-LTF, and L-SIG (540, 640) are subsequent to the VHT-SIG.

For another example, the VHT-SIG (520, 620) may include an indicator indicating a power level of transmission power corresponding to each data stream. Besides the transmission power indicator, the VHT-SIG (520, 620) may include information about a channel bandwidth and a channel bandwidth offset with respect to each data stream. Namely, information about how much channel bandwidth is used to transmit each data stream or information about through which subchannel each data stream is transmitted may be included in the VHT-SIG (520, 620).

Also, the VHT-SIG (520, 620) may include information about which station each data stream is transmitted to be targeted for or information about a destination of each data stream. Namely, whether or not a corresponding data stream should be transmitted to the second station or to the first station, the legacy station, is indicated in the VHG-SIG (520, 620).

Also, as mentioned above, the VHT-SIG (520, 620) may include information allowing identifying to which data stream each data stream corresponds to as an inverse stream.

Figure 7:
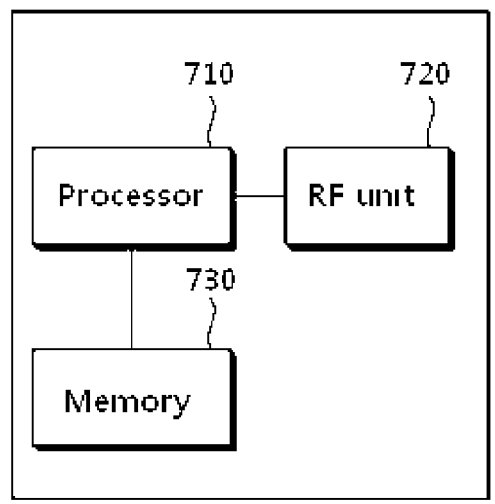
FIG. 7 is a schematic block diagram of a wireless communication device for performing the coexistent data stream transmission method according to an exemplary embodiment of the present invention.

FIG. 7 is a schematic block diagram of a wireless communication device for performing the coexistent data stream transmission method according to an exemplary embodiment of the present invention.

The wireless communication device may be an AP of a WLAN system or a station of a wireless mesh network. The wireless communication device includes a processor 710 and a radio frequency (RF) unit 720. A memory 730 is connected to the processor 710 and stores various information for driving the processor 710. The memory 730 may include a read-only memory (ROM), a random access memory (RAM), a flash memory, a memory card, a storage medium and/or any other storage units. Besides, the wireless communication device may further include a display unit or a user interface. Those elements are not illustrated in the drawing and its detailed description will be also omitted.

The processor 710 may include an application-specific integrated circuit (ASIC), a chip set, a logical circuit, and/or a data processing unit. The processor 710 may generate data or a control signal to be transmitted to other stations. The other stations include the first station, the legacy station, the second station, the station supporting the WLAN system more evolved than the first station, and the like. A control signal to be transmitted to the first station and/or second station may be, for example, the coexistent data stream transmission information as described above. In case of transmitting data streams with each different transmission power to the first and second stations, the coexistent data stream transmission information may be transmission power information of each data stream.

Here, a data stream targeted for the first station will be referred to as a first data stream, and a data stream targeted for the second station will be referred to as a second data stream. In this case, the processor 710 may adjust the transmission power of the first and second data streams such that it is different. In an exemplary embodiment of the present invention, the transmission power of the first data stream is set to be higher than that of the second data stream.

Instead of adjusting the transmission power, the processor 710 may generate inverse streams of the data streams and transmit them together. To this end, the processor 710 may generate coexistent data stream transmission information in order to inform receiver side stations that the inverse streams are also transmitted together and/or which streams are inverse streams.

The RF unit 720, connected to the processor 710, transmits radio signals generated from the processor 710, or receives a radio signal transmitted by a different wireless communication device. The RF unit 720 may include a baseband circuit for processing radio signals. The signal transmission may be performed in a broadcasting manner or unicasting manner. The wireless communication device performing the coexistent data stream transmission method according to an exemplary embodiment of the present invention supports multiple antennas. First, the RF unit 720 may transmit the coexistent data stream transmission information.

Also, the RF unit 720 may transmit a plurality of data streams to each station via the multiple antennas. When the RF unit 720 transmits the plurality of data streams each with a different transmission power level, if the receiver side station supports only a single antenna, the receiver side station may receive only a data stream received with the most powerful signal strength and recognize the other data streams as interference.

When the processor 710 generates inverse streams and transmits them together, the RF unit 720 may transmit the data streams and their inverse streams via the multiple antennas. In this case, inverse streams of only the data streams targeted for the second station supporting the multiple antennas or the relatively wider channel bandwidth may be generated and transmitted. Then, resultantly, the first station supporting the single antenna or the relatively narrower channel bandwidth receives the integrated stream in which the data streams targeted for the second station have been canceled out, thus receiving only the data stream pertinent to the first station. The second stations may separately restore each data stream according to the coexistent data stream transmission information to normally receive only the data stream pertinent to the second station.

The methods described so far may be implemented by processors such as microprocessors, controllers, microcontrollers, application specific integrated circuits (ASICs), and the like, according to software or program codes coded to perform the methods, or the process of the station illustrated in FIG. 3. Designing, developing, and implementing of the codes may be obvious to the skilled person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method for transmitting a multiple input multiple output (MIMO) packet in a wireless local area network, the method comprising:
generating a physical layer protocol data unit (PPDU) including a short training field (STF), a long training field (LTF), a very high throughput (VHT)-signal field, a VHT-STF, a VHT-LTF and a plurality of data streams,
the STF being used for at least one receiver to estimate an automatic gain control and a coarse frequency offset,
the LTF being used for the at least one receiver to estimate a fine frequency offset,
the VHT-STF being used for improving automatic gain control estimation in a MIMO transmission, and
the VHT-LTF being used for estimating a MIMO channel based on the plurality of data streams; and
transmitting the PPDU to the at least one receiver,
wherein the VHT-signal field includes first information, second information and third information, the first information indicating that the plurality of data streams in the PPDU are simultaneously received by the at least one receiver, the second information indicating which receiver is targeted for the plurality of data streams, and the third information indicating a bandwidth used for a transmission of the plurality of data streams.

2. The method of claim 1,
wherein the PPDU further includes a first signal field including a length field indicating a length of the plurality of data streams, and
wherein the first signal field is subsequent to the VHT-LTF and precedes the plurality of data streams.

3. The method of claim 1, wherein the bandwidth indicated by the third information is one of 20 MHz, 40 MHz and 80 MHz.

4. A device configured to transmit a multiple input multiple output (MIMO) packet in a wireless local area network, the device comprising:
a processor; and
a memory operatively coupled with the processor and storing instructions that when executed by the processor cause the device to:
generate a physical layer protocol data unit (PPDU) including a short training field (STF), a long training field (LTF), a very high throughput (VHT)-signal field, a VHT-STF, a VHT-LTF and a plurality of data streams,
the STF being used for at least one receiver to estimate an automatic gain control and a coarse frequency offset,
the LTF being used for the at least one receiver to estimate a fine frequency offset,
the VHT-STF being used for improving automatic gain control estimation in a MIMO transmission,
the VHT-LTF being used for estimating a MIMO channel based on the plurality of data streams, and
transmit the PPDU to the at least one receiver,
wherein the VHT-signal field includes first information, second information and third information, the first information indicating that the plurality of data streams in the PPDU are simultaneously received by the at least one receiver, the second information indicating which receiver is targeted for the plurality of data streams, and the third information indicating a bandwidth used for a transmission of the plurality of data streams.

5. The device of claim 4,
wherein the PPDU further includes a first signal field including a length field indicating a length of the plurality of data streams, and
wherein the first signal field is subsequent to the VHT-LTF and precedes the plurality of data streams.

6. The device of claim 4, wherein the bandwidth indicated by the third information is one of 20 MHz, 40 MHz and 80 MHz.

7. A method for receiving a multiple input multiple output (MIMO) packet in a wireless local area network, the method comprising:
receiving a physical layer protocol data unit (PPDU) from a transmitter,
wherein the PPDU including a short training field (STF), a long training field (LTF), a very high throughput (VHT)-signal field, a VHT-STF, a VHT-LTF and a plurality of data streams,
the STF being used for at least one receiver to estimate an automatic gain control and a coarse frequency offset,
the LTF being used for the at least one receiver to estimate a fine frequency offset,
the VHT-STF being used for improving automatic gain control estimation in a MIMO transmission, and
the VHT-LTF being used for estimating a MIMO channel based on the plurality of data streams, and
wherein the VHT-signal field includes first information, second information and third information, the first information indicating that the plurality of data streams in the PPDU are simultaneously received by the at least one receiver, the second information indicating which receiver is targeted for the plurality of data streams, and the third information indicating a bandwidth used for a transmission of the plurality of data streams.

8. The method of claim 7,
wherein the PPDU further includes a first signal field including a length field indicating a length of the plurality of data streams, and
wherein the first signal field is subsequent to the VHT-LTF and precedes the plurality of data streams.

9. The method of claim 7, wherein the bandwidth indicated by the third information is one of 20 MHz, 40 MHz and 80 MHz.

10. A device configured to receive a multiple input multiple output (MIMO) packet in a wireless local area network, the device comprising:
a processor; and
a memory operatively coupled with the processor and storing instructions that when executed by the processor cause the device to:
receive a physical layer protocol data unit (PPDU) from a transmitter,
wherein the PPDU including a short training field (STF), a long training field (LTF), a very high throughput (VHT)-signal field, a VHT-STF, a VHT-LTF and a plurality of data streams,
the STF being used for at least one receiver to estimate an automatic gain control and a coarse frequency offset,
the LTF being used for the at least one receiver to estimate a fine frequency offset,
the VHT-STF being used for improving automatic gain control estimation in a MIMO transmission, and
the VHT-LTF being used for estimating a MIMO channel based on the plurality of data streams, and wherein the VHT-signal field includes first information, second information and third information, the first information indicating that the plurality of data streams in the PPDU are simultaneously received by the at least one receiver, the second information indicating which receiver is targeted for the plurality of data streams, and the third information indicating a bandwidth used for a transmission of the plurality of data streams.

11. The device of claim 10, wherein the PPDU further includes a first signal field including a length field indicating a length of the plurality of data streams, and wherein the first signal field is subsequent to the VHT-LTF and precedes the plurality of data streams.

12. The device of claim 10, wherein the bandwidth indicated by the third information is one of 20 MHz, 40 MHz and 80 MHz.

* * * * *